July 2, 1935.  E. E. WINKLEY  2,006,781
MOTOR VEHICLE
Filed Aug. 1, 1931    7 Sheets-Sheet 3
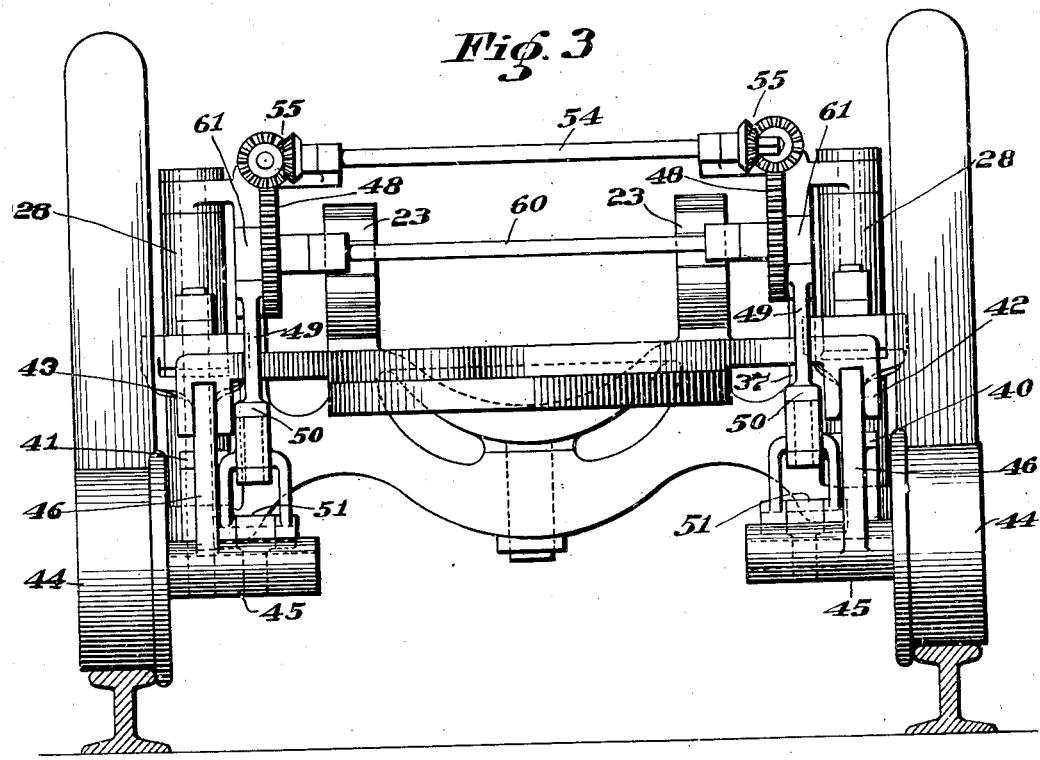
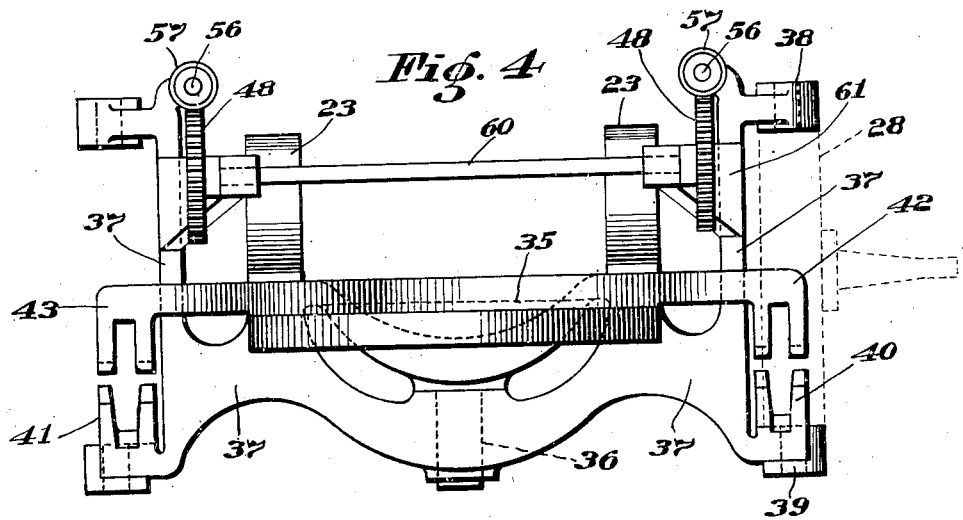
INVENTOR
Erastus E. Winkley
BY Warren G. Ogden
his ATTORNEY

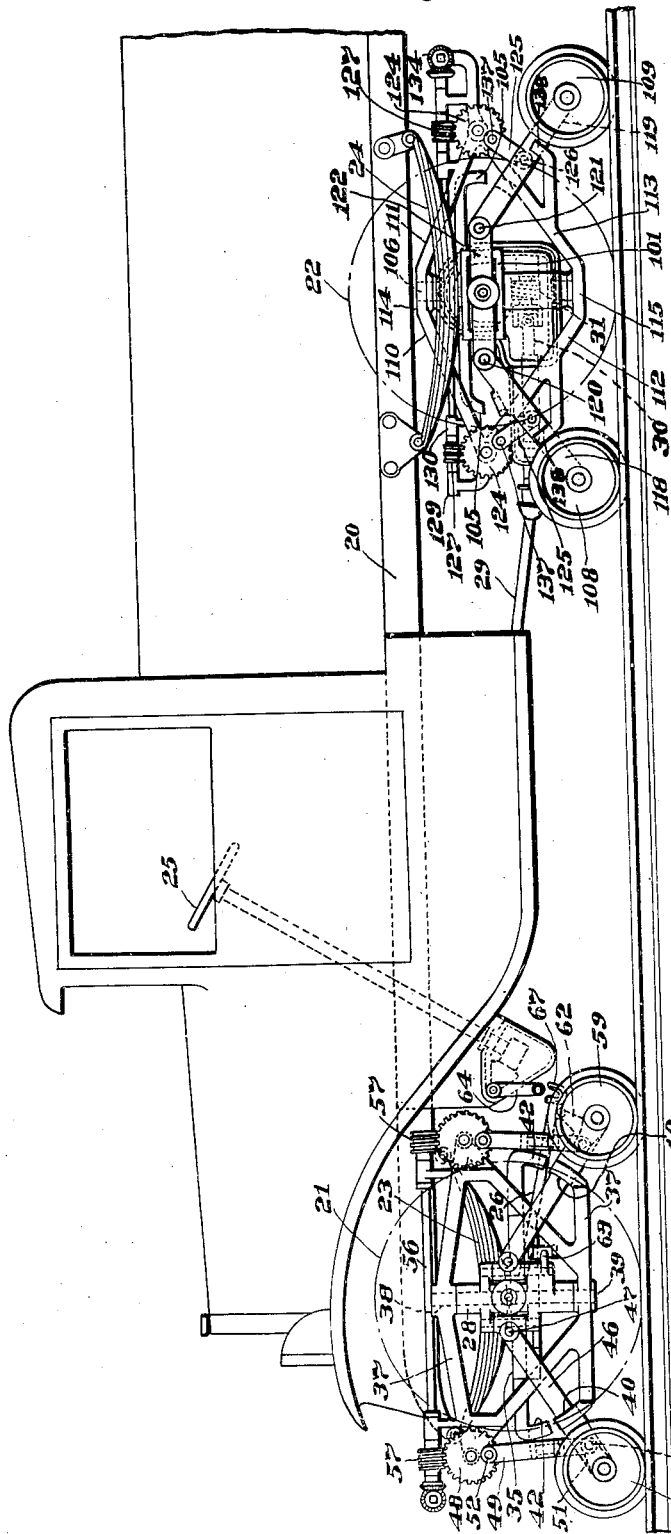

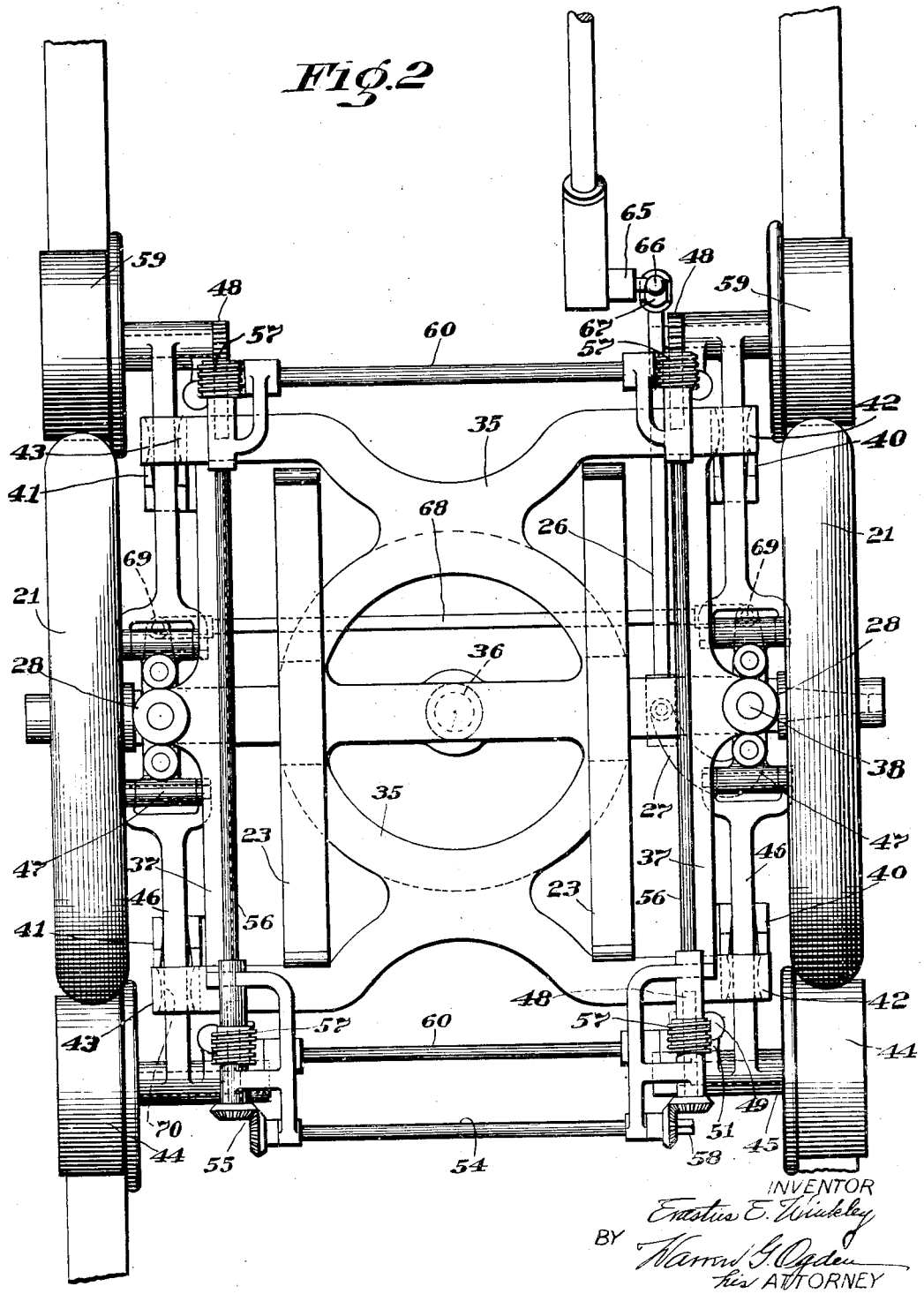

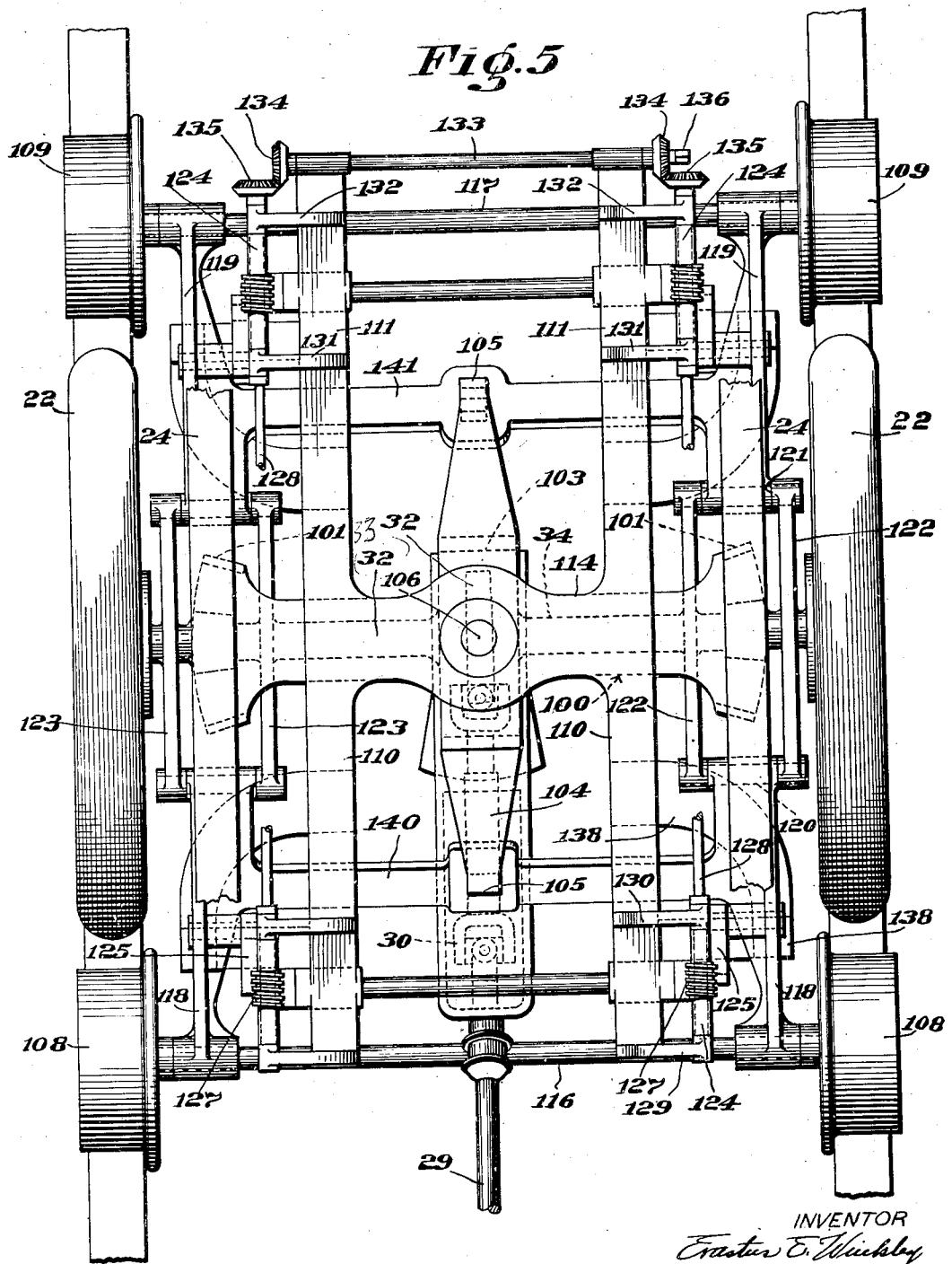

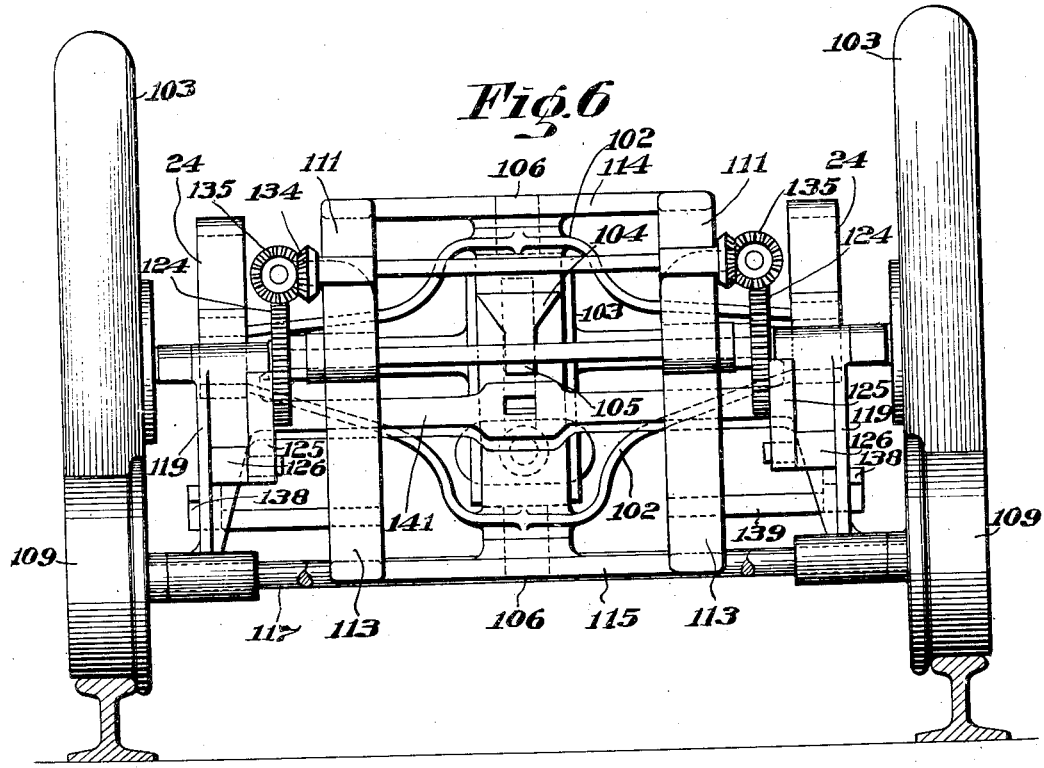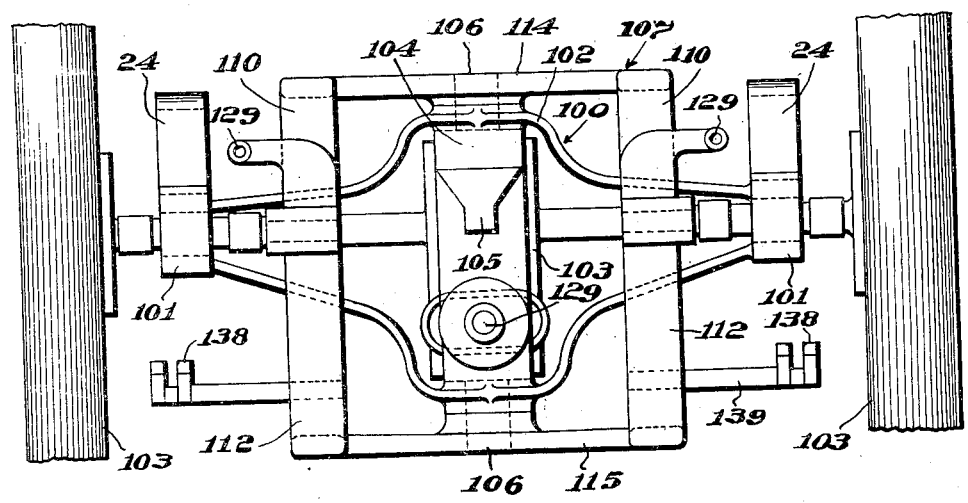

July 2, 1935.　　　　　E. E. WINKLEY　　　　　2,006,781
MOTOR VEHICLE
Filed Aug. 1, 1931　　　　7 Sheets-Sheet 6
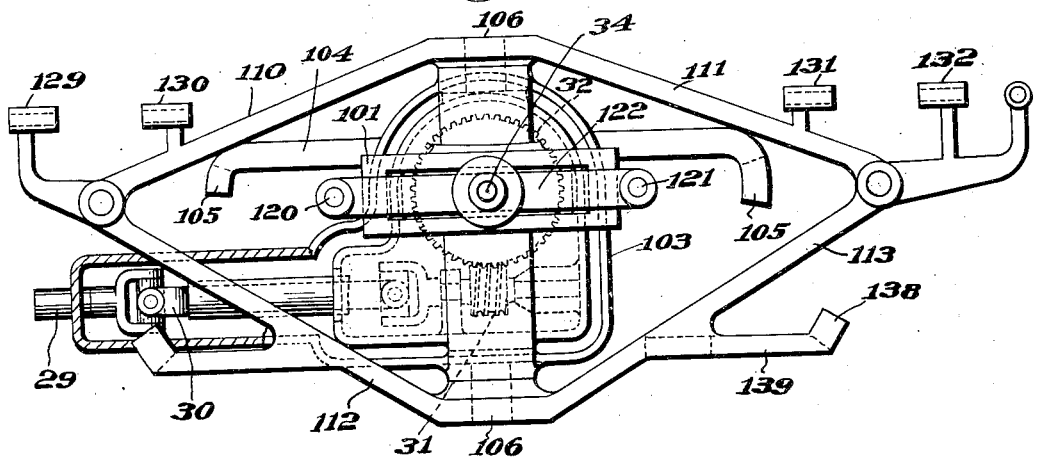
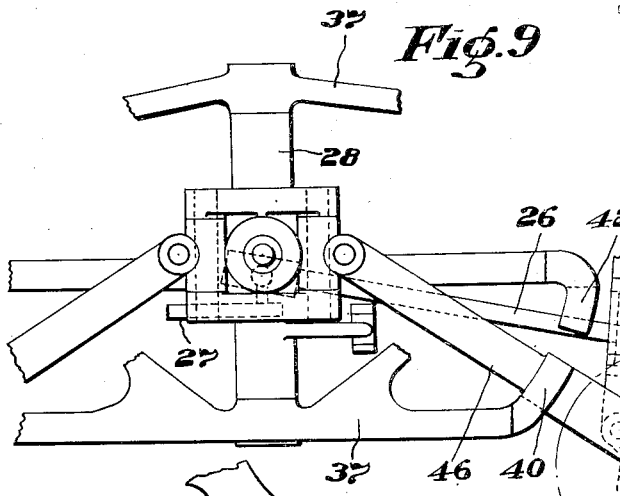
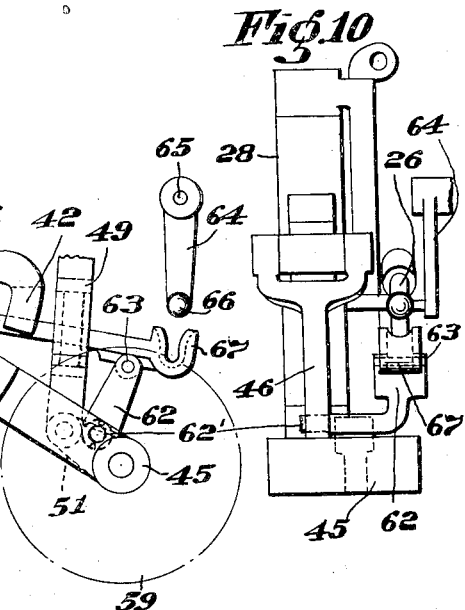
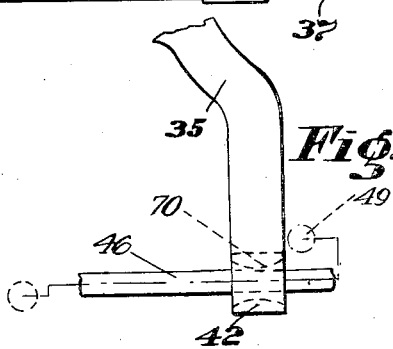

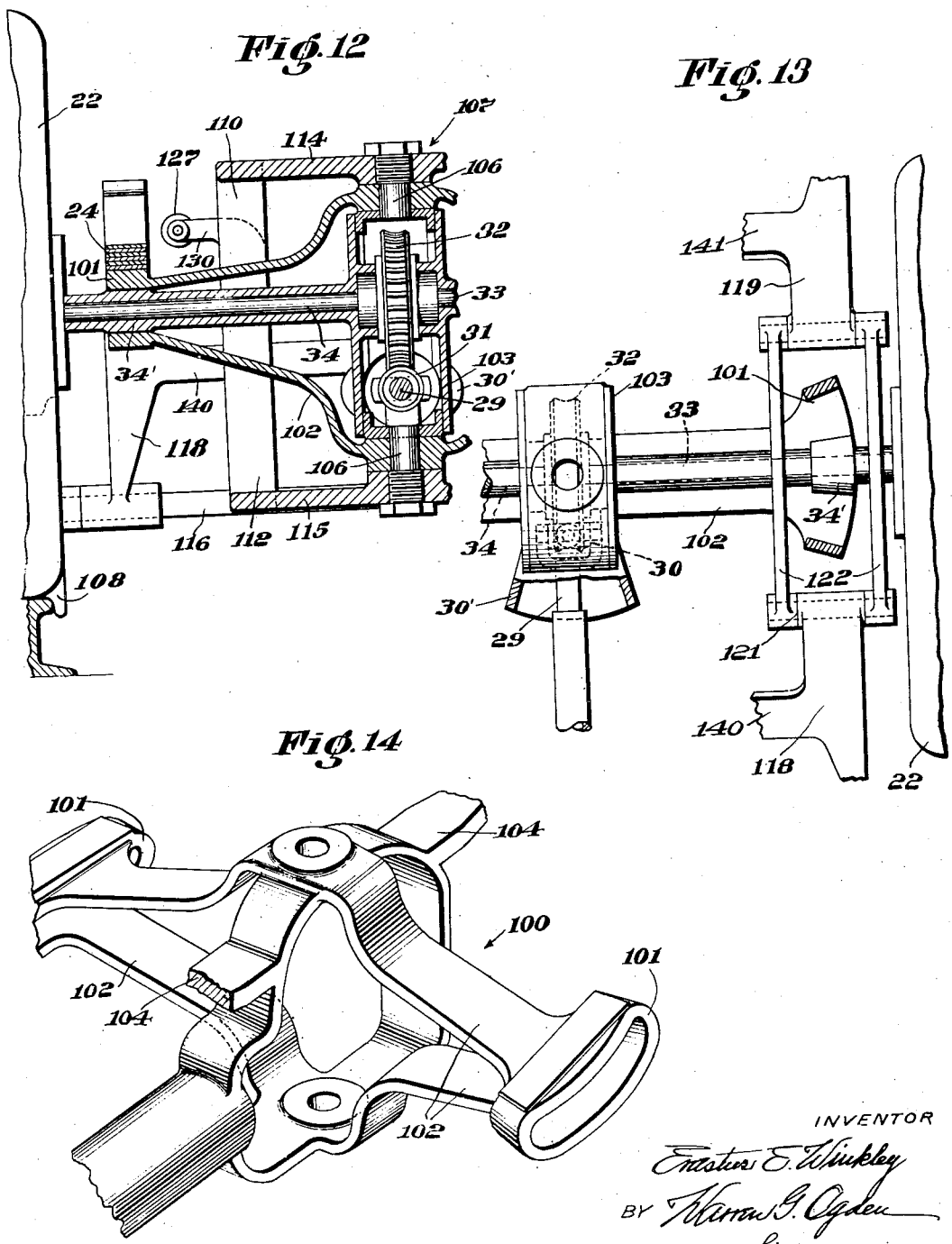

Patented July 2, 1935

2,006,781

UNITED STATES PATENT OFFICE 2,006,781

MOTOR VEHICLE

Erastus E. Winkley, Lynn, Mass.

Application August 1, 1931, Serial No. 554,472

20 Claims. (Cl. 105—215)

This invention relates to motor-vehicles and has special relation to such vehicles for road or track operation.

The general object of the invention is to provide a road-operating motor-vehicle which, by a simple mechanism, can quickly be adapted for travelling on a railroad track.

A particular object of the invention is to provide such a vehicle having front and rear trucks, each pivoted thereto and each provided with guiding devices, such as two pairs of flanged wheels, and a pair of road wheels disposed therebetween, together with mechanism for lowering said flanged wheels or other suitable guides to operative position for co-operation with a track to adapt the vehicle for track travel, and for raising the same to inoperative position to adapt the same for road travel.

Another object is to provide a rigid connection between each pair of guides or flanged pilot wheels and the trucks with which said wheels are associated so that when said wheels or guides are in either their uppermost or lowermost positions there will be no relative vertical movement between the same and said trucks and therefore no tendency for such wheels or guides to drop from their inoperative position during road-running, or to leave the track on curves during track-running.

Another object is to provide adjustable means for simultaneously raising or lowering the flanged wheels or guiding devices of the pilot trucks and locking the same when in the desired adjusted operative position for movement with the truck, and other means for locking said wheels so as to permit of angular movement when they are in upper or inoperative position and thereby permit steering during road operation.

A further object is to provide means whereby the lowering of the flanged wheels to operative position will automatically disconnect the steering wheel from the steering mechanism of the front road-wheels.

Various other objects of my invention will hereinafter appear in the detailed description of the invention.

With the foregoing objects in view, my invention contemplates the use of front and rear pilot trucks, each embodying "fifth-wheel" construction to which the front and rear pairs of flanged pilot wheels or other suitable guiding members are locked for track operation, and which in turn is locked to the vehicle when said wheels or members are in raised or inoperative position, so that the vehicle can be operated for road travel in the usual way.

My invention comprises a front and rear truck, each pivotally connected to the vehicle and each having suitable guiding members, herein shown as two pairs of flanged wheels with a pair of road wheels disposed therebetween, and means for lowering said flanged wheels or guides into operative position for track running, and for raising the same to inoperative position for road operation, together with means for locking said flanged wheels or guides when in operative position for movement with the truck, and other means for so connecting said wheels or guides to the vehicle when in inoperative position as to permit of angular movement thereof with respect to the vehicle and thereby permit steering during road operation.

My invention comprises further a convenient means for simultaneously moving the flanged wheels or guides from one position to the other, and holding the same against vertical movement in both positions, such means preferably consisting of a pitman so connected between each flanged wheel and a manually-operated gear-wheel that when said flanged wheels are in their extreme positions, each pitman is in alignment with the journal of its gear wheel and its own points of connection therewith and with said flanged wheels. Inasmuch as the tires of the road-wheels eventually become reduced in diameter by wear or on account of deflation, the means for raising and lowering the flanged wheels or guides must be adjustable and therefore my invention involves the use of raising and lowering means constructed to permit the placing of the flanged wheels or guides in any desired adjusted position substantially level with the point contact of the road-wheels with the track in order to maintain the traction.

Means are provided whereby the lowering of the flanged wheels to track-running position will automatically disconnect the steering wheel from the steering-knuckle mechanism of the front road wheels.

The rear truck preferably is provided with a universal joint arranged between the transmission shaft and the differential gearing so as to permit of relative movement between the rear truck which is pivoted about the differential casing and the drive shaft when the vehicle is used for track operation. My invention involves an arrangement whereby during track operation there can be relative turning movement of the rear axles with respect to the truck, such movement being about the pivotal connection of said truck to the differential, whereby said road wheels which furnish traction for the vehicle are at all times maintained in co-operation with the track.

My invention comprises also the various parts and combination of parts hereinafter described and set forth in the appended claims.

In the drawings which accompany and form a part of this specification and which are to be considered merely as illustrative of one embodiment thereof, and not as restrictive—

Figure 1 is a view, in side elevation, of a motor-vehicle embodying my invention;

Fig. 2 is a plan view of the front pilot truck and associated mechanism;

Fig. 3 is a view, in front elevation, of the front pilot truck and parts asssociated therewith;

Fig. 4 is a view, in front elevation, of the frame forming a part of said front pilot truck;

Fig. 5 is a plan view of the rear pilot truck and associated mechanism;

Fig. 6 is a view, in rear elevation, of the rear pilot truck and parts associated therewith;

Fig. 7 is a view, in front elevation, of the frame forming a part of said rear pilot truck and some of the parts co-operating therewith;

Fig. 8 is a view, in side elevation, of the rear truck frame and some of its co-operating parts;

Fig. 9 is a view, in side elevation, showing the details of the construction of the means for automatically disconnecting the steering wheel from the steering mechanism when the flanged wheels are lowered to operative position;

Fig. 10 is a view, in rear elevation, of said steering-wheel disconnecting mechanism;

Fig. 11 is a fragmentary underside view of a detail of construction;

Fig. 12 is a view, in central transverse section, of one half of the rear pilot truck looking from rear to front of the vehicle;

Fig. 13 is a view, in plan, of one half of the rear pilot truck, the upper portion of the rear axle housing having been removed together with the supporting frame to disclose underlying parts; and Fig. 14 is a view, in perspective, of the rear axle housing before assembly.

In the particular drawings selected for more fully disclosing the principle of my invention, 20 (Fig. 1) represents the chassis of a motor-vehicle provided with the usual front and rear road-travelling wheels 21, 22, the usual front and rear springs 23, 24 interposed between the wheel-supporting mechanisms and the chassis, and a steering wheel 25 provided with any of the usual devices for imparting forward and backward motion to the drag link 26 (Figs. 1, 2 and 9) which is pivotally connected by the arm 27 to the steering knuckle 28.

The transmission shaft 29 (Figs. 1 and 5) is connected through the duplex universal joint 30 to the drive worm 31 (Figs. 12 and 13) meshing with the worm gear 32 to which the differential gearing (not shown) is attached, and through which the rear road-wheel axles 33, 34 are driven in the usual way.

The construction of the motor-vehicle and the means for operating and controlling the same for road travelling are substantially the same as those now in common use. The present invention resides in mechanism whereby such road-travelling truck can quickly be converted into a track-running vehicle.

In order to adapt said vehicle for track travelling I provide the same with front and rear pilot trucks, each having two pairs of flanged wheels suitably spaced for engaging the tracks of the standard gage railroad, and associated mechanism for holding them in upper position when the vehicle is travelling on a road and for lowering them into engagement with the track when it is desired to operate the vehicle on such track.

Referring particularly to Figs. 2, 3, and 4, the horizontal frame 35 is secured to the chassis by the springs 23 and depending from said frame and pivotally connected thereto at 36 is a fifth-wheel construction which, with the flanged wheels and means for locking the same thereto, constitutes the forward pilot truck. Said fifth-wheel construction comprises the frame 37 in which the steering knuckle 28 is journalled vertically at 38, 39, and is provided with two pairs of oppositely-disposed upwardly-extending forks 40, 41 (Fig. 4) for locking the flanged pilot wheels to the fifth wheel for track operation, while said frame 35 is provided with two pairs of downwardly-extending forks 42, 43 for connecting said fifth-wheel construction to said vehicle when the latter is used for road operation.

The forward pair of flanged wheels 44 are journalled in short bearings 45 connected by the arms 46 to the steering knuckles 28 for vertical and lateral movement by means of the universal joint constructions 47 (see Figs. 1 and 2).

Mounted in the frame which constitutes a part of the forward truck are a pair of gear wheels 48 between each of which and one of the short axles of the flanged wheels is articulated a pitman 49, said pitman having a swivel joint 50 intermediate its ends, thereby permitting slight lateral movement of the flange wheels with respect to the truck and about said swivel joint as a center when said wheels are maintained in their upper or inoperative position.

As more clearly shown in Fig. 1 the pitman 49 is so connected between the worm gear 48 and the arm 51 (Figs. 1 to 3) integral with or rigidly connected to the journal 45 that in either uppermost or lowermost position of the flanged wheels, said pitman is in alignment with its points of connection 52, 53, to said worm gear 48 and said arm 51, respectively, and with the center of said worm gear, whereby there is provided an absolutely rigid connection between each pair of flanged pilot wheels and the trucks with which said wheels are associated, this construction being one of the salient features of the invention because thereby the flanged wheels are prevented from leaving their inoperative position during road running and from leaving the track when taking curves during track running.

While various means for actuating the worm-wheels 48 simultaneously or otherwise will readily occur to those skilled in the art, I have illustrated a simple arrangement for effecting this result consisting of the transverse rod 54 (Figs. 2 and 3) connected by bevelled gearing 55 with the longitudinal rods 56 which carry the worms 57, the latter meshing with the worm-wheels 48, and the whole structure being actuated by a crank co-operating with the squared end 58 of said transverse rod.

The connection to the truck of the rearward pair of flanged wheels 59 and the mode of operation thereof are identical with that above described in connection with the forward pair 44, in both cases the worm-wheels 48 being shown as rigidly connected with the cross-shafts 60 and journaled in the triangular-shaped brackets 61

(Fig. 2), shown in the present instance as integral with the frame 37.

Means are provided for automatically disconnecting the steering wheel from the steering mechanism when the track wheels are in operative position and in the present instance such means comprise an arm 62 (Figs. 9 and 10) disposed at right angles to the rearward arm 46 on the lefthand side of the vehicle and pivoted thereto at 62', said arm having a bifurcated upper end 63 which embraces the drag link 26, and is pivotally connected to the same. The lower end of the arm 64, arranged to be oscillated about its pivot 65 (in the usual manner) by the steering wheel mechanism, is provided with a ball 66 arranged to take into a suitably-shaped socket provided in the end 67 of the drag link. As will be obvious from an inspection of Figs. 9 and 10, the steering wheel is disconnected from the steering mechanism when the flanged wheels are in track-running position while when said wheels are raised to inoperative position, the ball 66 will be securely housed in the end socket of the drag link, whereby the movement of the lever 64 produced by the steering wheel mechanism, will effect a reciprocatory movement of the drag link to rotate the steering knuckle about its pivots 38, 39 through the interposition of the steering knuckle arm 27.

The present method of steering automobiles is based on the theory that if a vehicle is to turn a corner without sideward slip of any of the wheels, the linkage of the steering wheel must be such that the axles of all the wheels when produced intersect a common vertical line. The vertical line forms for that angle of rotation a momentary axis. It is impossible to accurately maintain this condition and the closest approximation is the modern trapeze form of steering linkage, shown on Fig. 2 by the tie-rod 68 cross connecting the arms 69 extending rearward from the respective knuckles. This is known as the Ackerman system from one of the originators of the divided axle system employed.

It will be noted that when the flanged wheels of the forward truck are in operative position for track travelling, the arms 46 are embraced by the forks 40, 41 (shown in the present instance as flared outwardly) so that said wheels are securely held against lateral movement with respect to said truck. When, however, the flanged wheels are raised, and the said arms 46 are embraced by the downwardly-extending forks 42, 43, so as to connect said wheels to the vehicle in their inoperative positions, the construction must be such as to permit of slight lateral movement of the arms with respect to the truck. The reason for this is that each of the two pair of arms 46 are pivotally connected off-center to a steering knuckle which of course turns about its pivot when the vehicle is taking curves, and therefore there will be a slight inward movement of each arm 46, and of each connected pitman 49 on its pivotal connection to a gear wheel 48, toward its point of connection with said steering knuckle. It is observed that the knuckle and pitman pivots are not in alignment and to permit such motion each pitman is provided with a swivel 50 permitting its lower end to rotate and compensate for the angular movement of the arm 46 as it is drawn inward. Inasmuch as the movement of each arm 46 with respect to its holding fork 42, 43, is angular, the proximate inward surfaces of said fork must be curved or beveled and clearance is allowed for the simultaneous slight lateral movement, as indicated at 70, (see Fig. 11).

I am aware that heretofore it has been proposed to provide road vehicles with one pair of flanged track wheels disposed forwardly of the road wheel; but such construction renders it impossible to back a vehicle when running on a curved track. An important feature of my invention, therefore, resides in the provision of two pairs of flanged wheels, one disposed forwardly and the other rearwardly of the road wheel, whereby it is possible to back the vehicle on a curved track as well as drive it forward.

*Rear Truck.*—The rear truck also is provided with two pairs of flanged wheels with a pair of road wheels disposed therebetween, two such pairs of flanged wheels being necessary for the rear truck for the reason above explained in connection with the forward truck. As in the case of the forward truck, I employ in the rear truck a fifth-wheel construction which is brought into play for track running and is locked to the vehicle for road travelling, and I provide means similar to those above described for elevating and depressing the flanged wheels and maintaining the same in uppermost and lowermost position.

Referring to Figs. 6, 7, 12 and 14, 100 represents the rear axle housing suspended from the chassis by the springs 24, already referred to. The said housing is materially different from that ordinarily employed on motor trucks for the reason that on track operation there is relative movement between the rear axles and the longitudinal axis of the chassis when the vehicle is going around a curve. The reason for this will be obvious when it is considered that the rear road wheels which furnish traction for the vehicle must always remain in contact with the track. In order to permit of such relative turning movement of the rear axles with respect to the truck, the said axle housing consists in the particular form illustrated of two open-ended structures 101 upon which the springs 24 bear and through which the rear axles 33 and 34, respectively, project. The parts 101 are connected together by the open framework 102 to which are attached the casing 103 containing the drive worm 31, the drive wheel 32 and the differential gearing, as well as the longitudinally-extending arms 104 (Figs. 5, 8 and 13), the end of each of which is provided with a downturned end 105 for maintaining the flanged wheels when in inoperative position against relative lateral movement with respect to the vehicle, as hereinafter more fully described. Pivotally connected to the rear axle housing by the trunnions 106 is a frame 107 (Figs. 6, 7 and 12) which, with the two pairs of flanged track wheels 108, 109 and the mechanism hereinafter to be described for raising and lowering the same, constitutes the rear truck.

The said frame (Fig. 8) comprises the two pairs of upper arms 110, 111 and the two pairs of lower arms 112, 113. The two pairs of arms 110, 111 are connected by the upper central horizontal member 114, and the two pairs of arms 112 and 113 are connected by the lower central horizontal member 115, said horizontal members affording bearings for the trunnions 106 whereby said frame is pivotally connected to the rear axle housing.

The two pairs of flanged wheels 108, 109 are mounted on the axles 116, 117 (Figs. 5 and 6), respectively, which are journaled in the lower ends of the two pairs of arms 118, 119 (Figs. 1, 5 and 13), respectively, the upper ends of said arms being pivotally connected at 120, 121 to the two pairs of spaced parallel plates 122, 123 in which the rear axles 33, 34, respectively, have bearings. Two pairs of worm wheels 124 are suitably mounted for rotation in the frame formed by the arms 110, 111, 112, 113 and each said wheel is connected by a pitman 125 (Figs. 1 and 6) to one of the arms 118, 119 through the stud 126 so that by a 180° rotation of each said worm wheel, the flanged wheels 108, 109 are raised to inoperative position for road running. A convenient means for actuating said wheels 124 simultaneously consists in the worms 127 mounted on the longitudinal shafts 128 which have their bearings in the arms 129, 130 and 131, 132 carried by the upper arms 110, 111 of the rear truck frame. The longitudinal rods 128 are actuated by the transverse shaft 133 mounted in the frame and carrying at its respective ends bevel gears 134 meshing with similar gears 135 carried by the co-operating ends of the rods 128, the said shaft 133 being rotated manually by a crank taking over the squared end (Fig. 5) of said shaft. The connection between the worm wheels 124 and the arms 118, 119 is such that in both operative and inoperative positions each pitman is in alignment with the bearing of its worm wheel, its point of connection 137 with said wheel and its point of connection 126 with said arm, whereby a rigid unyielding connection between each arm and its corresponding worm wheel is provided and any movement of said arm from either upper or lower position is prevented.

Means somewhat similar to those described in connection with Fig. 1 are provided for connecting the flanged wheels to the fifth-wheel construction for track operation and for connecting said fifth-wheel construction to said vehicle for road operation. In either operative or inoperative position the flanged wheels are maintained against lateral movement with respect to the truck.

The particular means disclosed in the present instance for holding the flanged wheels in their operative position consist of the upwardly-directed forks 138 which are formed on the ends of the arms 139 integral with the arms 112, 113; and the means now preferred by me for holding said wheels in their upper or inoperative position consist of the fingers 105 on the ends of the bar 104 aforesaid, which fingers take into suitably shaped apertures in the cross-bars 140, 141 which connect and preferably are integral with the pairs of arms 118, 119, respectively.

When the vehicle is travelling on a road and the fifth-wheel structure is made inoperative by the depending fingers 105 engaging bars 140 and 141, as aforesaid, the rear truck has no movement with respect to the drive shaft or the longitudinal axis of the vehicle, and in such case the differential performs its usual function of compensating for the unequal rotational speeds of the road wheels when the vehicle is making a curve. It will be noted that as the rear axles have bearings in the housings 101 each located between one of the pairs of spaced parallel plates 122, 123, respectively, and as the arms 118, 119 are connected to said plates, there can be no motion between said plates and the rear truck when said arms are held in their upper position.

When, however, the flanged wheels are lowered to operative position and their arms 118, 119 are connected to the truck, there will be a slight relative turning movement between said truck and vehicle on curves, and in such case the rear axles will swing with respect to the vehicle and truck, such swinging being permitted and limited by bearing blocks 33' and 34' (Figs. 5, 12 and 13) within the open-ended box-like structures 101 (Fig. 14) with which the rear axle housing is provided. The duplex universal joint 30 permits of such relative movement between the rear axles and the propeller shaft and a flaring forward housing 30' (Figs. 5 and 13) permits freedom of sidewise angular movement in the joint.

Having thus described an illustrative embodiment of my invention without however limiting the same thereto, what I claim and desire to secure by Letters Patent is:

1. A motor-vehicle comprising in combination, a front truck pivotally connected to said vehicle and having two pairs of flanged wheels, a pair of road wheels disposed between said pairs of flanged wheels, means for lowering said flanged wheels to operative position for co-operation with a track and for raising the same to inoperative position, and means for connecting said flanged wheels to said truck for pivotal movement therewith when lowered to operative position.

2. A motor-vehicle comprising in combination, a front truck having two pairs of flanged wheels, a pivotally mounted arm for supporting each of said wheels, a pair of road wheels disposed between said pairs of flanged wheels, means for lowering said flanged wheels to operative position for co-operation with a track and for raising the same to inoperative position, and means for connecting the arms of said flanged wheels to said truck, when in inoperative position, so as to permit of slight angular movement thereof with respect to said truck.

3. A motor vehicle comprising in combination, a truck having two pairs of flanged wheels, a pivoted arm supporting each flanged wheel, a pair of road wheels disposed between said pairs of flanged wheels, and actuating means above and having connection to said arms for lowering said flanged wheels to operative position for co-operation with a track and for raising the same to inoperative position, said connection comprising a pivoted link biased by said means to a position to prevent vertical movement between said pivoted arms and truck in both positions of said flanged wheels.

4. A motor-vehicle comprising in combination, a truck having two pairs of flanged wheels, means for lowering said flanged wheels to operative position for co-operation with a track and for raising the same to inoperative position, said means comprising an arm pivotally connecting each said wheel to said truck, a gear wheel journalled in said truck above each said arm, a pitman articulated to each said arm and gear wheel, each said pitman being in alignment with its points of connection to its co-operating arm and gear wheel and with the center of said gear wheel when said flanged wheels are in uppermost and lowermost positions, and means for simultaneously actuating said gear wheels.

5. A motor-vehicle comprising in combination, a fifth-wheel construction, two pairs of flanged wheels each pair being mounted on a vertically movable frame, means for lowering said frames to lower said flanged wheels to operative position for co-operation with a track, means for connecting said frames for rotation with said fifth-wheel construction when said flanged wheels are lowered to operative position, and other means co-operating with said frames for locking said fifth-wheel construction against rotation when said flanged wheel frames are raised lifting their wheels to an inoperative position.

6. A motor-vehicle comprising in combination, a truck having road wheels and two pairs of flanged wheels, a pivotally mounted arm for supporting each of said flanged wheels, means for lowering said flanged wheels to operative position for co-operation with a track and for raising the same to inoperative position for road running, said means comprising a gear wheel above each said supporting arms and a pitman pivotally connecting each gear wheel with the arm below it, each said pitman being provided with a swivel to permit slight angular movement of each said flanged wheel arms, when in inoperative position, with respect to said vehicle.

7. A motor-vehicle comprising in combination, a truck having two pairs of vertically-movable flanged wheels for track engagement, a pair of road wheels disposed between said pairs of flanged wheels, a steering wheel, mechanism operatively connecting said steering wheel with said road wheels when said flanged wheels are in inoperative position, and means for lowering said flanged wheels to operative position for co-operation with a track and simultaneously disconnecting said steering wheel from said mechanism.

8. A motor-vehicle comprising in combination, a rear truck having two pairs of flanged wheels, a pair of road wheels disposed between said pairs of flanged wheels, a transmission shaft, differential gearing for transmitting power from said shaft to said road wheels, a fifth-wheel construction pivoted to said truck about the casing of said differential gearing, means for lowering said flanged wheels to operative position for co-operation with a track and for raising them to inoperative position, means for connecting said flanged wheels when in operative position to said fifth-wheel construction, and means for connecting said flanged wheels to said vehicle and for preventing movement of said fifth-wheel construction when said flanged wheels are raised to inoperative position.

9. A motor-vehicle comprising in combination, a rear truck having two pairs of flanged wheels, a pair of road wheels disposed between said pairs of flanged wheels, a propeller shaft, differential gearing for transmitting power from said shaft to said road wheels, means pivotally connecting said truck to the casing of said differential gearing, and a housing for the axles of said road wheels, said housing being constructed and arranged to permit of relative movement between said axles and said housing about the pivotal connection of said truck to said casing.

10. A motor-vehicle comprising in combination, a pair of road wheels, axles for said wheels, a housing for said axles, a rear truck pivotally connected to said housing, means for locking said truck to said vehicle, said housing terminating at its ends in open-ended boxes through which said axles, respectively, project, whereby relative movement of said axles and vehicle is permitted when said truck is not locked to said vehicle, and means for preventing relative movement of said axles and vehicle when said truck is locked to said vehicle.

11. A motor-vehicle comprising in combination, a rear truck mounted on a vertical axis and provided with two pairs of flanged wheels and a pair of road wheels disposed between said flanged wheels, means for lowering said flanged wheels to operative position for co-operation with a track and simultaneously making them rigid with said road wheels to turn therewith on said axis, and for raising the same to inoperative position, and a flexible power connection constructed and arranged to permit of movement of said rear truck on its axis relative to the vehicle.

12. In a motor vehicle a forward truck having, in combination, an Ackerman system and a fifth wheel system of steering, and a single means for placing the vehicle alternatively under control of one or the other of said two systems of steering.

13. In a motor vehicle a forward truck having, in combination, a pair of wheels for road running, two pairs of flanged wheels for track running, mounted fore and aft of said road wheels, means for raising and lowering said flanged wheels for road and for track running respectively, an Ackerman system of steering for road running, a fifth wheel system of steering for track running, and means for automatically excluding control by the Ackerman or the fifth wheel systems made effective by the lowering or raising, respectively, of said flanged wheels.

14. In a motor vehicle a forward truck having, in combination, an Ackerman system and a fifth wheel system of steering, and means under control of the operator for selectively connecting either system for steering control of the vehicle while simultaneously excluding the other.

15. In a motor vehicle a rear truck having, in combination, a differential, a pair of road wheels driven by said differential, a fifth wheel construction to which said differential and said road wheels are connected, two pairs of flanged wheels for track running fore and aft of said road wheels and mounted on said fifth wheel construction to be raised and lowered for road and track running respectively, said fifth wheel construction being free to rotate when said flanged wheels are lowered, and co-operating means on the vehicle and the flanged wheel mounts effective to lock the fifth wheel construction against movement when said flanged wheels are raised.

16. A motor vehicle having both Ackerman and fifth wheel systems of steering in its forward truck and a differential box carried by and movable with a fifth wheel construction in its rear truck, means under control of the operator for rendering the vehicle responsive to steering control by the two fifth wheel systems, a power shaft from the engine to the differential, and a flexible coupling in said power shaft to compensate for angular movement of the differential box when the rear truck turns relatively to the vehicle on said fifth wheel construction.

17. A motor vehicle having road wheels and both Ackerman and fifth wheel systems of steering in its forward truck, flanged guide wheels fore and aft of each road wheel movable down and up to operative or inoperative position for track running, a rear truck having road wheels, a fifth wheel construction and a differential box carried by and movable with said fifth wheel construction, flanged guide wheels fore and aft of each road wheel movable down and up to operative or inoperative position for track running, and means for locking said fifth wheel systems of both front and rear trucks made effective by the raising of said guide wheels to inoperative position.

18. A motor vehicle for both road and track running having a truck, road wheels mounted on said truck, a fifth wheel construction embodied in said truck, flanged track wheels mounted on said truck movable to a raised or lowered position relatively to the road wheels for road running or track running respectively, all of said wheels being under the fifth wheel guiding control when running on a track, and means to exclude said fifth wheel guiding control when running on a road.

19. In a motor vehicle for both road and track running a truck having a pair of road wheels mounted thereon and embodying a fifth wheel construction to which said road wheels are connected to steer the vehicle when running on a track, means for locking said fifth wheel to the frame of the vehicle when running on a road, and a second steering control independent of said fifth wheel construction.

20. In a motor vehicle a rear truck having, in combination, a differential, a pair of road wheels driven by said differential, a fifth wheel construction to which said differential and said road wheels are connected comprising a fixed frame within which said differential is pivotally mounted, said frame having transversely extending portions each terminating in an open-ended structure through which the two axles of the road wheels, respectively, project and forming bearings for said axles as the fifth wheel rotates, and means for locking said axles from movement within their said bearings at the will of the operator.

ERASTUS E. WINKLEY.